(12) United States Patent
Kusuda et al.

(10) Patent No.: US 8,427,820 B2
(45) Date of Patent: Apr. 23, 2013

(54) PROTECTIVE PANEL WITH TOUCH INPUT FUNCTION SUPERIOR IN SURFACE FLATNESS AND ELECTRONIC APPARATUS HAVING THE PROTECTIVE PANEL

(75) Inventors: Yasuji Kusuda, Kyoto (JP); Mitsutoyo Toshihara, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 273 days.

(21) Appl. No.: 13/059,765

(22) PCT Filed: Aug. 20, 2009

(86) PCT No.: PCT/JP2009/064558
§ 371 (c)(1),
(2), (4) Date: Feb. 18, 2011

(87) PCT Pub. No.: WO2010/021357
PCT Pub. Date: Feb. 25, 2010

(65) Prior Publication Data
US 2011/0151937 A1 Jun. 23, 2011

(30) Foreign Application Priority Data
Aug. 21, 2008 (JP) ................................ 2008-213266

(51) Int. Cl.
*H05K 5/00* (2006.01)
*H05K 7/00* (2006.01)
*G06F 3/02* (2006.01)

(52) U.S. Cl.
USPC ............ 361/679.21; 361/679.26; 361/679.27; 361/679.28; 361/679.29; 361/679.02; 345/169

(58) Field of Classification Search ............. 361/679.01, 361/679.02, 679.08, 679.09, 679.21–679.29, 361/679.3, 679.55–679.59; 345/156, 157, 345/168, 169
See application file for complete search history.

(56) References Cited

U.S. PATENT DOCUMENTS

| 7,554,624 B2 | 6/2009 | Kusuda et al. |
| 2004/0233789 A1 | 11/2004 | Oguchi et al. |
| 2008/0094942 A1 | 4/2008 | Oguchi et al. |

(Continued)

FOREIGN PATENT DOCUMENTS

| JP | 2006-48166 | 2/2006 |
| JP | 2007-292787 | 11/2007 |

(Continued)

OTHER PUBLICATIONS

International Search Report issued Dec. 1, 2009 in International (PCT) Application No. PCT/JP2009/064558.

(Continued)

*Primary Examiner* — Jayprakash N Gandhi
*Assistant Examiner* — Jerry Wu
(74) *Attorney, Agent, or Firm* — Wenderoth, Lind & Ponack, L.L.P.

(57) ABSTRACT

In a protective panel with a touch input function of an electronic apparatus display window, with a built-in antenna being placed on a back side thereof, an upper electrode sheet and a lower electrode panel that constitute the protective panel with a touch input function are respectively provided with radio-wave transmitting sections with no conductor formed therein, within a frame area to be covered with a decorative layer, in association with the built-in antenna, and with respect to all the portion or most of the portion of a border relative to the conductor of the radio-wave transmitting section on the upper electrode sheet side, since a paste layer, used for bonding the upper electrode sheet to the lower electrode panel at peripheral edge portions thereof, is provided with a through hole in a manner so as to overlap with, at least, an area near the inside of the border, with air inside the through hole being allowed to flow in or flow out through an air bent.

9 Claims, 18 Drawing Sheets

U.S. PATENT DOCUMENTS

2010/0029339 A1* 2/2010 Kim et al. .................... 455/566
2010/0033442 A1* 2/2010 Kusuda et al. ................ 345/173

FOREIGN PATENT DOCUMENTS

WO      2005/064451      7/2005
WO      2008/081710      7/2008

OTHER PUBLICATIONS

International Preliminary Report on Patentability issued Mar. 17, 2011 in International (PCT) Application No. PCT/JP2009/064558.

* cited by examiner

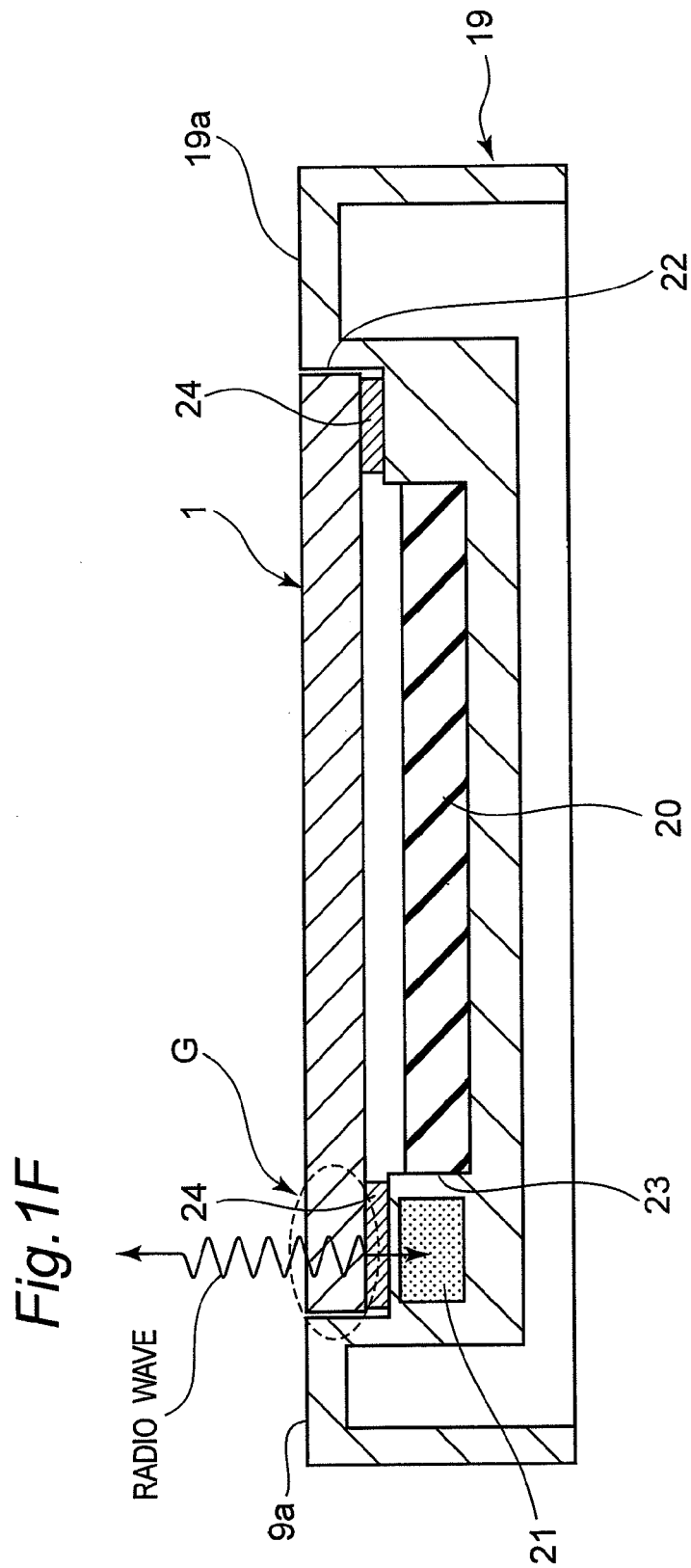

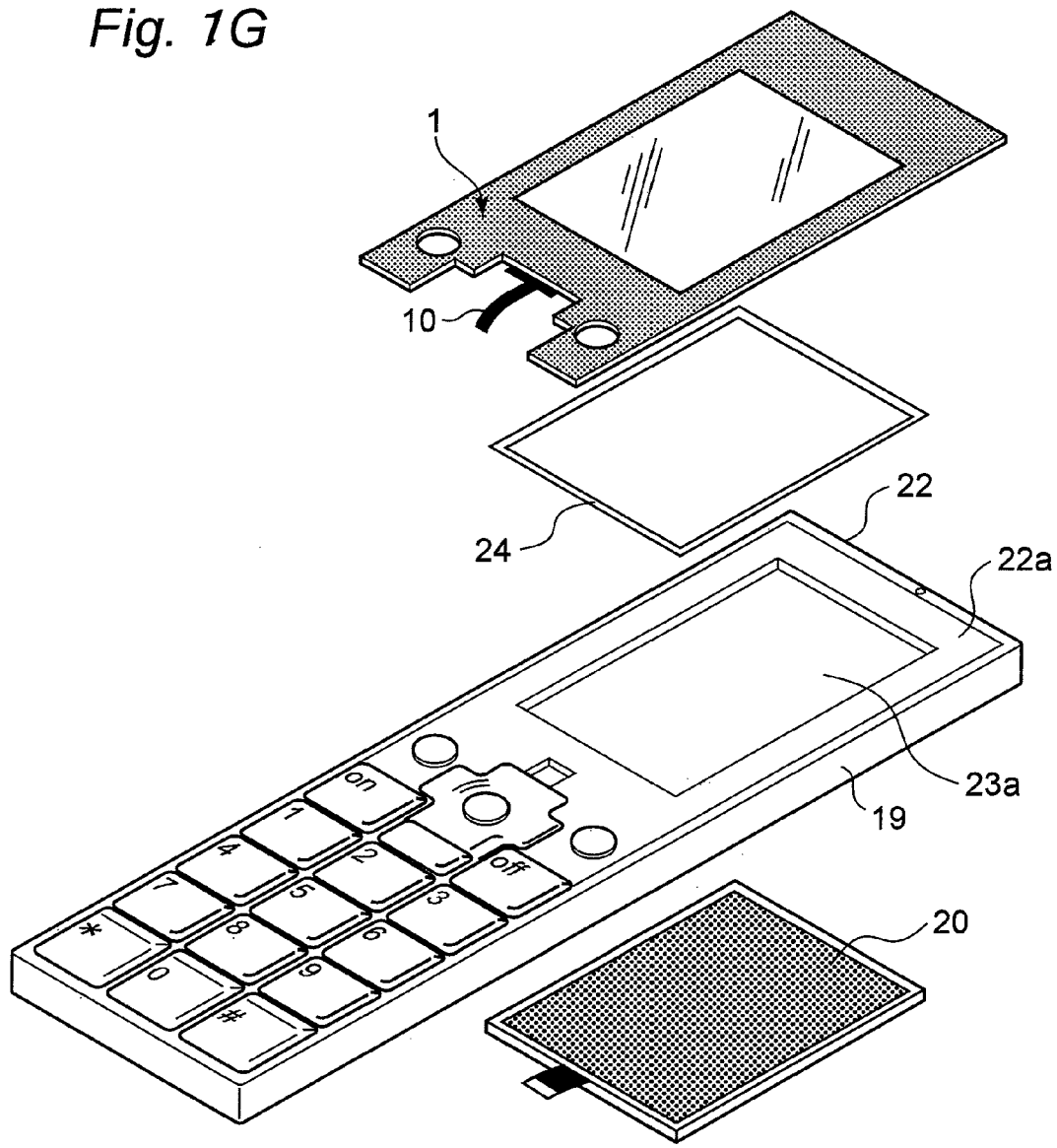

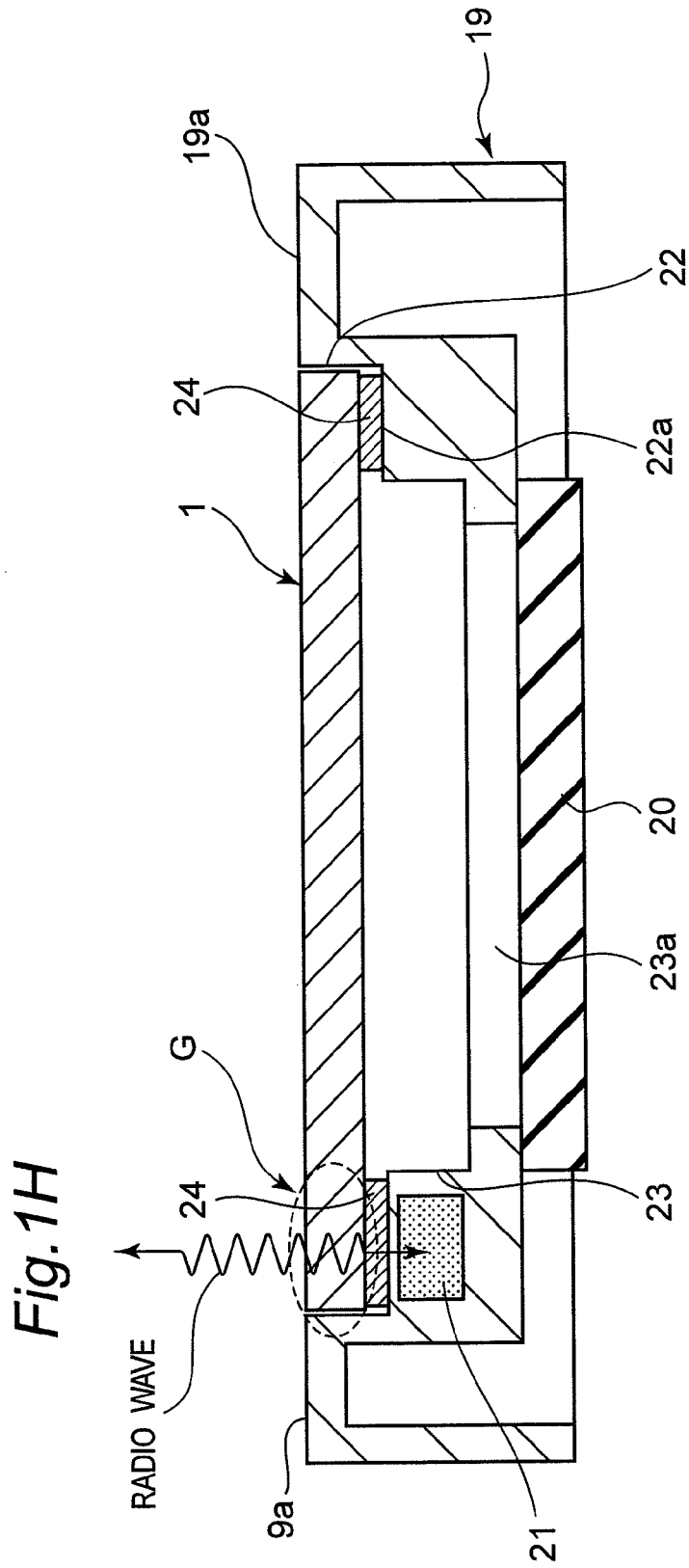

PROTECTIVE PANEL WITH TOUCH INPUT FUNCTION SUPERIOR IN SURFACE FLATNESS AND ELECTRONIC APPARATUS HAVING THE PROTECTIVE PANEL

TECHNICAL FIELD

The present invention relates to a protective panel with a touch input function that is superior in surface flatness and an electronic apparatus having the protective panel, which are effectively utilized as a portable information terminal such as a PDA (Personal Digital Assistant) or a handy terminal, an OA (Office Automation) apparatus such as a copying machine or a facsimile, a smart telephone, a portable telephone, a portable game machine, an electronic dictionary, a car navigation system, a small-size PC, or various home electric appliances.

BACKGROUND ART

In general, a front exterior casing for an electronic apparatus, such as a portable telephone or a smart telephone, has a structure in which a front exterior casing on the front side and a front exterior casing on the back side, made from a synthetic resin material, are combined with each other. Onto a surface of the front exterior casing on the front side, a protective panel is secured by a fusion-bonding process or the like, so as to protect a liquid crystal display window. As the protective panel, conventionally, a colorless transparent resin panel has been used; however, together with recent demands for fashionable electronic apparatuses, a decorative pattern such as rimming has been applied thereto by a printing process.

In recent years, in the field of portable telephones, a portable telephone provided with an input device function on a protective panel, as shown FIG. 12, has been highly expected as the next interface, and, for example, Patent Document 1 has disclosed such a telephone.

Referring to an exploded view of FIG. 13, the following description will discuss a protective panel 100 with a touch input function of an electronic apparatus display window in detail. In FIG. 13, the protective panel 100 with a touch panel function of an electronic apparatus display window is provided with a lower electrode panel 103 that has a lower transparent electrode 105 and lower circuits 107a and 107b installed on a periphery of the lower transparent electrode 105, which are placed on an upper surface of a protective panel main body, and an upper electrode 102a that has an upper transparent electrode 104 placed at a position opposed to the lower transparent electrode 105 on a lower surface of a transparent insulating sheet, and upper circuits 106a to 106d, and 107c and 107d, installed on a periphery of the upper transparent electrode 104, and is also provided with an upper electrode sheet 102a that is bonded to the lower electrode panel 103 at a peripheral edge portion so as to form an air cell between the transparent electrodes 104 and 105, and a decorative sheet 102b having a decorative layer 117 that is formed on a periphery of a transparent window portion 118 in a frame shape on at least one of the surfaces of the transparent insulating sheet so as to cover the lower circuits 107a and 107b and the upper circuits 106a to 106d and 107c and 107d, with the decorative sheet 102b bonded to an upper surface of the upper electrode sheet 102a.

The protective panel 100 with a touch input function having this structure is designed so that, when pressed at a point on a surface of the decorative sheet 102b thereof by a finger, or a pen, or the like, the decorative sheet 102b is warped centered on the pressed point integrally with the upper electrode sheet 102a (hereinafter, a laminated member of the upper electrode sheet 102a and the decorative sheet 102b is referred to as a movable sheet 102), with the result that respective transparent electrodes 104 and 105, formed on the inner surfaces of the upper electrode sheet 102a and the lower electrode panel 103, are made in contact with each other so that an input position is detected.

FIGS. 14A and 14B are cross-sectional views that show one example of a mounted structure in the front exterior casing, which uses the protective panel with a touch input function. As shown in FIGS. 14A and 14B, the front exterior casing 119 is provided with a panel fit-in portion 122 to which the protective panel 100 with a touch input function is fitted. The panel fit-in portion 122 is designed so that its depth is substantially equal to the thickness dimension of the protective panel 100 with a touch input function so as to form a seamless structure in which an outer surface of the protective panel 100 is allowed to form the same plane as its peripheral portion. Moreover, on a bottom surface of the panel fit-in portion 122, an opening or a concave section 123 that is slightly smaller than the bottom surface is formed for a display device 120 to be placed therein so as to be visually recognized from the outside through the protective panel with a touch input function, and on a peripheral edge 122a of the bottom surface, the protective panel 100 with a touch input function is supported, and is secured with an adhesive or a double-sided tape 124.

In this case, with respect to the frame area covered with the decorative layer of the upper electrode sheet 102a, the thicknesses of a portion where the upper circuits 106a to 106d, and 107c and 107d are formed and another portion where no circuits are formed are different from each other by the corresponding circuit portion. In an attempt to bond this to the lower electrode panel at peripheral edge portions by using a paste layer, a lower surface of the base member of the portion where no circuits are formed of the upper electrode sheet 102a needs to be pressed down to a level lower than a lower surface of the base member of the portion where the circuits are formed, and then bonded thereto. Since the paste layer 130 (see FIG. 16) is formed on the entire portion of a peripheral edge of the upper electrode sheet 102a, an abrupt deformation occurs in the base member of the upper electrode sheet 102a along the border between the portion where the circuits are formed and the other portion where no circuits are formed. As a result, since the entire movable sheet 102 is formed as a comparatively thin sheet having flexibility, a step (for example, a step of about 20 μm when the circuit thickness is about 10 μm), referred to as a sink mark 132 caused by the presence or absence of the circuit formation, is stood out, when a surface of the movable sheet 102 is viewed (see FIG. 16). The presence of this sink mark 132 on the decorative layer portion causes degradation of the outside appearance and is not desirable.

In order to avoid this sink mark, as shown in FIG. 15, a structure has been proposed (see Patent Document 2) in which, with respect to the upper electrode sheet 102a, the upper circuits 106a to 106d, and 107c and 107d are formed on the frame area corresponding to the upper transparent electrode 104 and the periphery of the upper transparent electrode 104 located on a lower surface of the transparent insulating sheet, and on a portion within the frame area where the upper circuits 106a to 106d, and 107c and 107d are not formed, a dummy circuit 125 used for adjusting the thickness is formed with substantially the same thickness as that of the upper circuits 106a to 106d, and 107c and 107d, in a manner so as not to cause a short circuit.

CITATION LIST

Patent Document

Patent Document 1: WO No. 2005/064451
Patent Document 2: WO No. 2008/081710, Pamphlet

SUMMARY OF INVENTION

Issues to be Solved by the Invention

In this case, the portable telephone or the like has a built-in antenna inside its device, and when a portion covering the built-in antenna of a exterior casing has a structure that hardly transmits radio waves, radio-wave interference tends to occur. For this reason, in the protective panel with a touch input function, the circuit formation near the antenna position should be avoided so as to prevent the built-in antenna from causing radio-wave interference. Of course, the dummy circuit is not an exception also. In other words, in a case where a proper sink-mark preventive measure by the use of the dummy circuit is not taken, the issue of the sink mark still remains near the antenna position.

In view of the foregoing issues with the prior art, it is an object of the present invention to provide a protective panel with a touch input function that is superior in surface flatness, and makes it possible to achieve both of advantages that no radio-wave interference is caused and that a superior outside appearance without sink mark is obtained, and an electronic apparatus having the protective panel.

Means For Resolving The Issues

In order to resolve the above-mentioned issues, the present invention provides a protective panel with a touch input function and an electronic apparatus that have the following structures.

According to a first aspect of the present invention, there is provided a protective panel with a touch input function of an electronic apparatus display window, which is superior in surface flatness, comprising:

a lower electrode panel provided with a lower transparent electrode and lower circuits formed on a periphery of the lower transparent electrode, which are placed on an upper surface of a protective panel main body made of a resin plate;

an upper electrode sheet provided with an upper transparent electrode placed at a position opposed to the lower transparent electrode and upper circuits formed on a periphery of the upper transparent electrode, which are placed on a lower surface of a transparent insulating sheet, with peripheral edge portions thereof being bonded to the lower electrode panel so as to form an air cell between the lower transparent electrode and the upper transparent electrode; and a decorative sheet that is provided with a decorative layer formed into a frame shape so as to cover the lower circuit and the upper circuit, and placed on at least one of surfaces of a transparent insulating sheet, the decorative sheet being bonded to an upper surface of the upper electrode sheet, wherein upon assembling, a built-in antenna is placed on a back side thereof, wherein the upper electrode sheet and the lower electrode panel are respectively provided with conductor non-formation areas for use in transmitting radio waves, where no conductors are formed, within a frame area to be covered with the decorative layer, in a planned area G for an antenna formation capable of accepting the built-in antenna, and with respect to all portion or most of the portion of a border of the conductor non-formation area on the upper electrode sheet side, a paste layer, used for bonding the upper electrode sheet to the lower electrode panel at the peripheral edge portions thereof, is provided with a through hole in a manner so as to overlap with, at least, an area near an inside of the border, so that air inside the through hole is allowed to flow in and out of the inside of the through hole through air bents that are allowed to communicate with the through hole.

According to a second aspect of the present invention, there is provided the protective panel with a touch input function that is superior in surface flatness according to the first aspect 1, wherein the through hole is also overlapped with an area near an outside of the border.

According to a third aspect of the present invention, there is provided the protective panel with a touch input function that is superior in surface flatness according to the first or second aspect, wherein the air bent is formed by a non-formation portion of the paste layer, and allowed to communicate with the air cell between the electrodes.

According to a fourth aspect of the present invention, there is provided the protective panel with a touch input function that is superior in surface flatness according to the first or second aspect, wherein the air bent is formed by a non-formation portion of the paste layer, and allowed to communicate with a hole-processed portion of the protective panel.

According to a fifth aspect of the present invention, there is provided the protective panel with a touch input function that is superior in surface flatness according to the first or second aspect, wherein the air bent is formed by a non-formation portion of the paste layer, and allowed to communicate with an outside of an end face of the protective panel.

According to a sixth aspect of the present invention, there is provided the protective panel with a touch input function that is superior in surface flatness according to the first or second aspect, wherein the air bent is made of a through hole formed on the lower electrode panel, and allowed to communicate with an outside of a lower surface of the protective panel.

According to a seventh aspect of the present invention, there is provided the protective panel with a touch input function that is superior in surface flatness according to the first or second aspect, wherein the upper electrode sheet and the lower electrode panel have a dummy circuit on a frame area covered with the decorative layer.

According to an eighth aspect of the present invention, there is provided an electronic apparatus comprising:

a front exterior casing provided with a panel fit-in portion;

a display device disposed on a bottom surface of the panel fit-in portion of the front exterior casing; and the protective panel according to the first or second aspect that is fitted into the panel fit-in portion of the front exterior casing so as to cover the display device.

According to a ninth aspect of the present invention, there is provided an electronic apparatus comprising:

a front exterior casing provided with a panel. fit-in portion having an opening on a bottom surface thereof;

a display device disposed on a back side of the panel fit-in portion so as to allow a display screen to be exposed to the opening of the bottom surface of the panel fit-in portion of the front exterior casing; and the protective panel according to the first or second aspect that is fitted to the panel fit-in portion of the front exterior casing so as to cover the display device.

Effects of the Invention

In the present invention, since the upper electrode sheet and the lower electrode panel have conductor non-formation areas for use in transmitting radio waves, no radio-wave interference occurs in a built-in antenna to be placed on the back side thereof. Moreover, with respect to all the portion or most of the portion of a border of a conductor in the conductor non-formation area on the upper electrode sheet side, since a paste layer, used for bonding the upper electrode sheet to the lower electrode panel at peripheral edge portions thereof, is provided with a through hole in a manner so as to overlap with, at least, an area near the inside of the border, no sink is generated. That is, it is possible to achieve both of the advantages that no radio-wave interference is caused and that a superior outside appearance without sink mark is obtained.

BRIEF DESCRIPTION OF THE DRAWINGS

These and other aspects and features of the present invention will become clear from the following description taken in conjunction with the preferred embodiments thereof with reference to the accompanying drawings, in which:

FIG. 1F is an explanatory view that explains that, in an electronic apparatus equipped with the protective panel with a tough input function in accordance with the embodiment of the present invention, no radio-wave interference is caused even upon allowing a radio wave to pass through an antenna;

FIG. 1G is an exploded perspective view that explains an electronic apparatus equipped with a protective panel with a touch input function in accordance with modified example of the embodiment of the present invention;

FIG. 1H is a cross-sectional view showing one example of a state after assembling a mounted structure in a front-face packaging casing in which the protective panel with a touch input function in accordance with the modified example of the embodiment of FIG. 1G of the present invention is used;

MODE FOR CARRYING OUT THE INVENTION

Figure 1A:
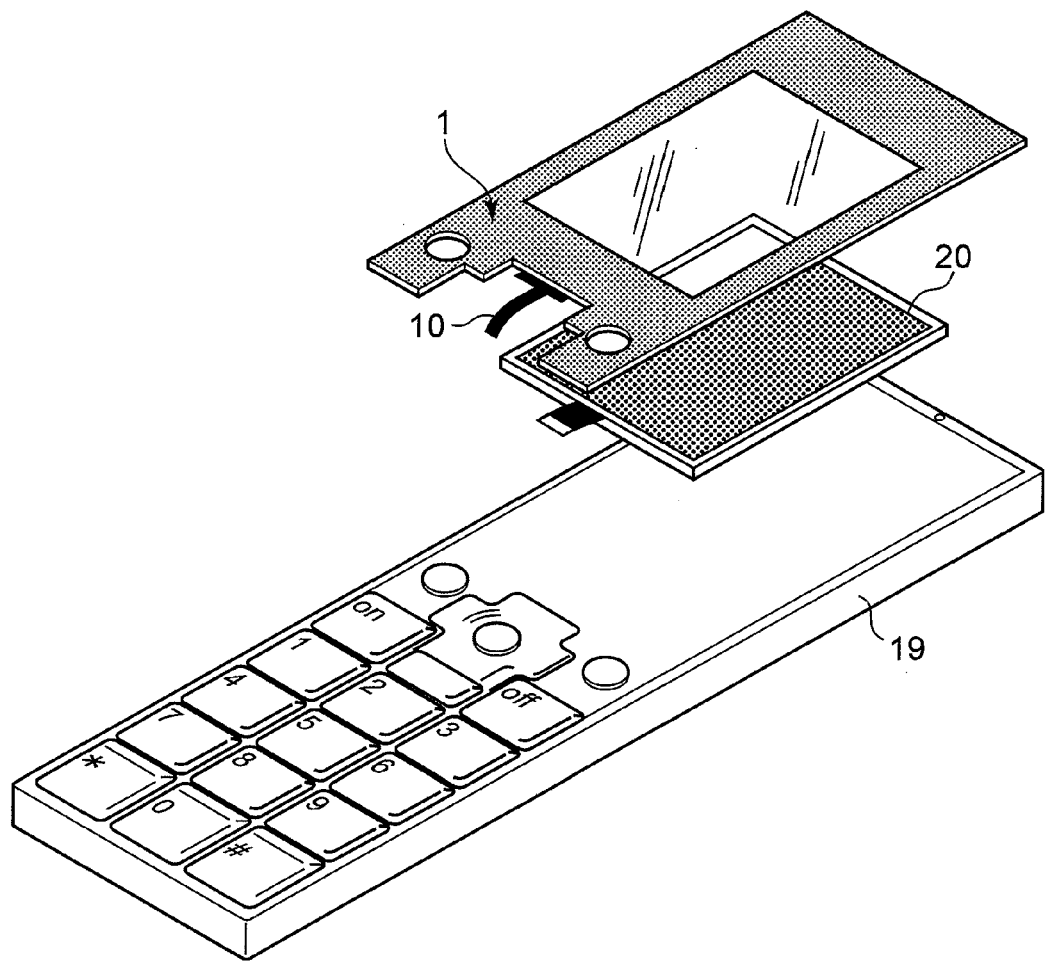
FIG. 1A is an exploded perspective view that explains an electronic apparatus equipped with a protective panel with a touch input function in accordance with one embodiment of the present invention.

Before the description of the present invention proceeds, it is to be noted that like parts are designated by like reference numerals throughout the accompanying drawings.

Referring to drawings, the following description will discuss embodiments of the present invention in detail.

Figure 1B:
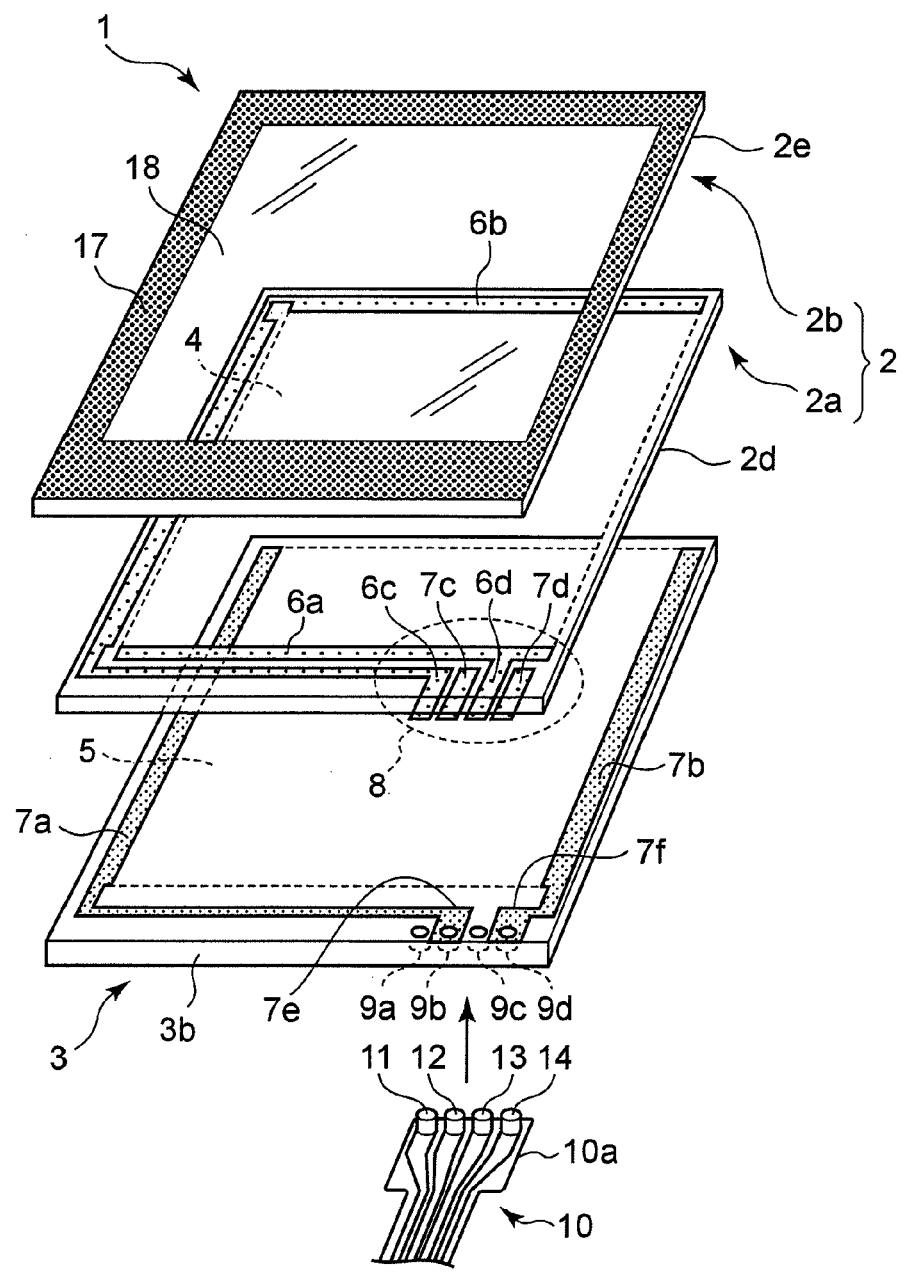
FIG. 1B is an exploded perspective view that explains the protective panel with a touch input function in accordance with the embodiment of the present invention.

Referring to FIGS. 1A and 1B, the following description will discuss a basic structure of a protective panel 1 with a touch input function in accordance with the embodiment of the present invention.

FIG. 1A shows an electronic apparatus provided with a protective panel 1 with a touch input function. This electronic apparatus includes a front exterior casing 19 having a panel fit-in portion 22, a display device 20 placed on a bottom surface of the panel fit-in portion 22 of the front exterior casing 19, and the protective panel 1 that is fitted into the panel fit-in portion 22 of the front exterior casing 19 so as to cover the display device 20. That is, the protective panel 1 is fitted into the front exterior casing 19 of the electronic apparatus (for example, a portable telephone), with the display device 20 being interposed therebetween, so that the display device 20 is protected and is allowed to exert predetermined touch inputting functions.

As shown in the exploded view of FIG. 1B, the protective panel 1 with a touch input function is provided with a lower electrode panel 3, an upper electrode sheet 2a, and a decorative sheet 2b.

The lower electrode panel 3 has a lower transparent electrode 5 having a rectangular shape and lower circuits 7a and 7b installed on a periphery of the lower transparent electrode 5, which are placed on an upper surface of a protective panel main body 3b constituted by a resin plate.

The upper electrode sheet 2a is provided with, at a lower surface of a transparent insulating sheet 2d, an upper transparent electrode 4 having a rectangular shape placed at a position opposed to the lower transparent electrode 5 on the lower surface, and upper circuits 6a to 6d, and 7c and 7d, installed on a periphery of the upper transparent electrode 4, and these members are bonded to one another with an adhesive at peripheral edge portions thereof so as to form an air cell 15 among the lower electrode panel 3, the upper transparent electrode 4, and the lower transparent electrode 5.

The decorative sheet 2b has a decorative layer 17 formed into a frame shape, and placed on a periphery of a transparent window portion 18 on at least one of surfaces of a transparent insulating sheet 2e, in a manner so as to cover (hide) the lower circuits 7a and 7b and the upper circuits 6a to 6d and 7c and 7d, and the decorative layer is bonded to an upper surface of the upper electrode sheet 2a.

The upper electrode sheet 2a and the decorative sheet 2b are bonded to each other to form a laminated member, and this laminated member is referred to as "a movable sheet 2".

The protective panel 1 with a touch input function having the above-mentioned structure is designed so that, when a surface of the decorative sheet 2b thereof is pressed at a point by a finger, or a pen, or the like, the decorative sheet 2b is warped centered on the pressed point integrally with the upper electrode sheet 2a, with the result that respective transparent electrodes 4 and 5, formed on inner surfaces of the upper electrode sheet 2a and the lower electrode panel 3, are made in contact with each other so that an input position is detected.

Figure 1C:
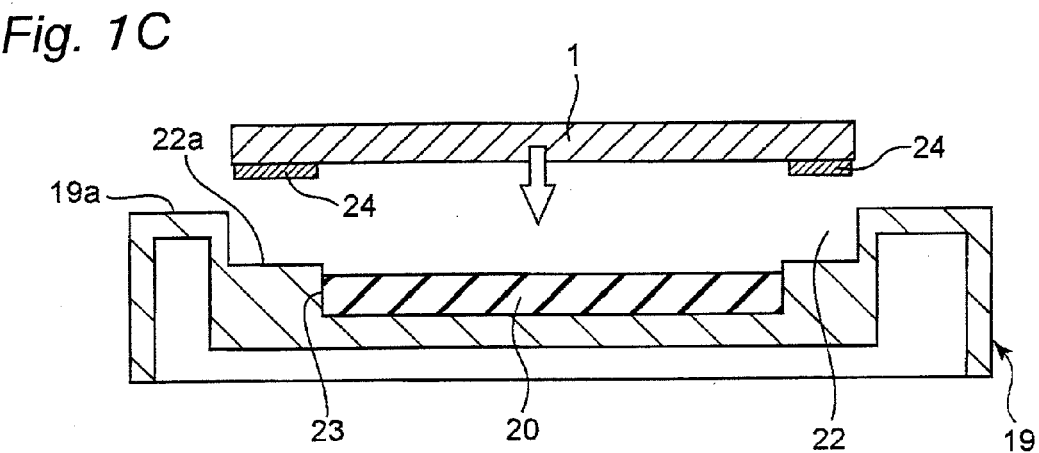
FIG. 1C is a cross-sectional view showing one example of a state prior to assembling a mounted structure in a front-face packaging casing in which the protective panel with a touch input function in accordance with the embodiment of the present invention is used.
Figure 1D:
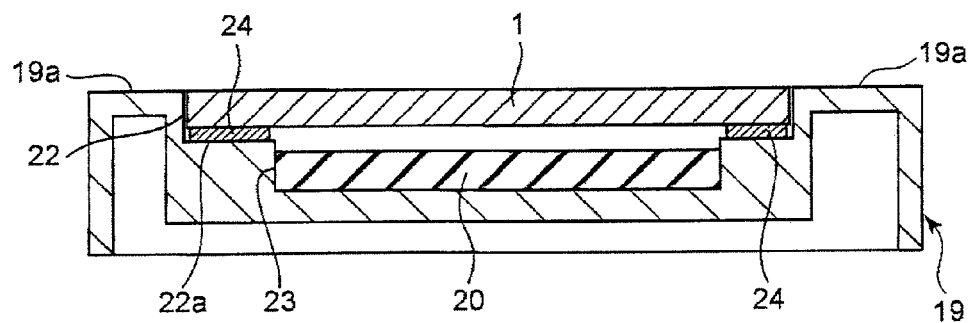
FIG. 1D is a cross-sectional view showing one example of a state after assembling the mounted structure in the front-face packaging casing in which the protective panel with a touch input function in accordance with the embodiment of the present invention is used.

FIGS. 1C and 1D are cross-sectional views that show one example of a mounted structure in the front exterior casing 19, which uses the protective panel 1 with a touch input function. As shown in FIGS. 1C and 1D, the front exterior casing 19 is provided with a panel fit-in portion 22 to which the protective panel 1 with a touch input function can be fitted. The panel fit-in portion 22 is designed so that its depth is substantially equal to the thickness dimension of the protective panel 1 with a touch input function so as to form a seamless structure in which an outer surface of the protective panel 1 is allowed to form the same plane as its peripheral portion (a frame portion 19a surrounding the panel fit-in portion 22). Moreover, on the bottom surface of the panel fit-in portion 22, a concave section 23 that is slightly smaller than the bottom surface is formed. This concave section 23 is formed for the display device 20 to be placed therein so as to be visually recognized from the outside of the protective panel 1 through the protective panel 1 with a touch input function, and the display device 20 is attached to the concave section 23. On a peripheral edge 22a of the bottom surface, the protective panel 1 with a touch input function is supported, and the protective panel 1 is secured onto the front exterior casing 19 with an adhesive or a double-sided tape 24.

Moreover, FIGS. 1G and 1H are cross-sectional views that show another mounted structure in the front exterior casing 19 using the protective panel 1 with touch input function. As shown in FIGS. 1G and 1H, the front exterior casing 19 is provided with a panel fit-in portion 22 to which the protective panel 1 with a touch input function can be fitted. The panel fit-in portion 22 is designed so that its depth is substantially equal to the thickness dimension of the protective panel 1 with a touch input function so as to form a seamless structure in which an outer surface of the protective panel 1 is allowed to form the same plane as its peripheral portion (a frame portion 19a surrounding the panel fit-in portion 22). Moreover, on a bottom surface of the panel fit-in portion 22, an opening 23a that is slightly smaller than the bottom surface and formed in a manner so as to penetrate the bottom surface is formed. This penetrating opening 23a is formed for the display device 20 to be placed therein so as to be visually recognized from the outside of the protective panel 1 through the protective panel 1 with a touch input function, and the display device 20 is attached to the back side (inside) of the fit-in portion 22 so as to allow the display screen of the display device 20 to be exposed to the opening 23a. On the peripheral edge 22a of the bottom surface of the panel fit-in portion 22, the protective panel 1 with a touch input function is supported, and the protective panel 1 is secured onto the front exterior casing 19 with an adhesive or a double-sided tape 24.

As the material for a resin plate to be used as a protective panel main body 3b, for example, a plastic plate, made from an engineering plastic material, such as a polycarbonate-based, polyamide-based, and polyether-ketone-based engineering plastic material, or a plastic material, such as an acryl-based, polyethylene-terephthalate-based and polybutylene-terephthalate-based plastic material, or a glass plate or the like may be used.

The thickness of the protective panel main body 3b is normally set to 0.5 mm to about 1.0 mm. In this case, for example, the thickness of the transparent insulating sheet 2e of the decorative sheet 2b is set to 25 μm to 125 μm, the thickness of the decorative layer 17 of the decorative sheet 2b is set to 1 μm to 20 μm, the thickness of an adhesive (PSA) bonding the upper electrode sheet 2a and the lower electrode panel 3 to each other is set to 12 μm to 100 μm, the thickness of the transparent insulating sheet 2d of the upper electrode sheet 2a is set to 25 μm to 190 μm, the thickness of each of the upper circuits 6a to 6d, and 7c and 7d of the upper electrode sheet 2a is set to 5 μm to 20 μm, the thickness of the paste layer 30 is set to 25 μm to 200 μm, the thickness of each of the lower circuits 7a and 7b of the lower electrode panel 3 is set to 5 μm to 20 μm, (the thickness of the transparent insulating sheet of the lower electrode sheet 3a of the lower electrode panel 3 is set to 25 μm to 190 μm, and the thickness of an adhesive (PSA) used for bonding the lower electrode sheet 3a of the lower electrode panel 3 onto an upper surface of the protective panel main body 3b is set to 12 μm to 100 μm), and thickness of the protective panel main body 3b of the lower electrode panel 3 is set to 0.5 mm to 1.0 mm.

The lower transparent electrode 5 and the lower circuits 7a and 7b may be directly formed on the protective panel main body 3b; however, normally, a lower electrode sheet 3a that is preliminarily provided with a lower transparent electrode 5 formed on an upper surface of a transparent insulating sheet and lower circuits 7a and 7b formed on the periphery of the lower transparent electrode 5 is used, and by bonding this lower electrode sheet 3a to the upper face of the protective panel main body 3b with an adhesive, the lower electrode panel 3 is formed. This method makes it possible to easily form the lower transparent electrode 5 and the lower circuits 7a and 7b.

As the material for the transparent insulating sheet used for the lower electrode sheet 3a and the upper electrode sheet 2a, for example, a film, made from an engineering plastic material, such as a polycarbonate-based, polyamide-based, and polyether-ketone-based engineering plastic material, or a plastic material, such as an acryl-based, polyethylene- terephthalate-based, and polybutylene-terephthalate-based plastic material, may be used.

The lower electrode sheet 3a and the upper electrode sheet 2a are placed so as to be opposed to each other with a gap being formed between the transparent electrodes 4 and 5, and peripheral edge portions thereof are bonded to each other with an adhesive. Each of the transparent electrodes 4 and 5 is formed by processes in which, after a metal oxide film, made from a material, such as tin oxide, indium oxide, antimony oxide, zinc oxide, cadmium oxide, or indium-tin oxide (ITO), or a composite film, mainly including these metal oxides, or a metal film, such as gold, silver, copper, lead, nickel, aluminum, or palladium, has been formed by a vacuum vapor deposition method, a sputtering method, an ion plating method, or a CVD method, the resulting film is patterned into a rectangular shape by an etching process or the like. Moreover, between the lower electrode panel 3 and the upper electrode sheet 2a, spacers, not shown, are formed so that, by the spacers, the two electrodes 4 and 5 are placed and separated from each other by the gap having a predetermined interval so as not to make the two electrodes 4 and 5 formed on the respective opposed surfaces erroneously in contact with each other.

The spacers can be obtained by forming a transparent photo-curable resin into fine dot shapes by photographic process. In place of this, a large number of fine dots may be formed by a printing method to be prepared as the spacers.

The upper transparent electrode 4 is formed on the upper electrode sheet 2a, and belt-shaped bus bars 6a and 6b, formed by using a metal, such as gold, silver, copper, or nickel, or a conductive paste such as carbon, to be connected thereto as the upper circuits 6a and 6b, are also formed thereon in parallel with each other. Moreover, the lower transparent electrode 5 is formed on the lower electrode sheet 3a, and belt-shaped bus bars 7a and 7b serving as the lower circuits 7a and 7b are also formed thereon in a direction orthogonal to the bus bars 6a and 6b. The belt-shaped bus bars 6a, 6b, 7a and 7b can be formed respectively by using a printing method, such as a screen printing method, an offset printing method, a gravure printing method, or a flexographic printing method.

Moreover, the respective bus bars 6a and 6b on the upper electrode sheet 2a have their circuits extended to a connecting portion 8 formed at an edge of the upper electrode sheet 2a so as to be gathered into one portion. Furthermore, the respective bus bars 7a and 7b on the lower electrode sheet 3a have their circuits extended to positions opposed to the connecting portion 8 formed at the edge of the upper electrode sheet 2a, that is, to an edge of the lower electrode sheet 3a, so as to be gathered into one portion. More specifically, for example, in the present embodiment shown in FIG. 1B, the respective bus bars 6a and 6b of the upper electrode sheet 2a and electrode ends 6d and 6c of the connecting portion 8 are respectively connected to each other, and the bus bars 6a and 6b are respectively extended to the connecting portion 8, and gathered to each other at the connecting portion 8. Moreover, the bus bars 7a and 7b of the lower electrode panel are respectively connected to extended portions 7e and 7f (lower circuit extended portions) of the lower circuit, placed at positions opposed to the connecting portion 8 on the lower electrode sheet 3a, so that the bus bars 7a and 7b are respectively extended to positions opposed to the connecting portion 8. The electrode end portions 7c and 7d are respectively formed on the connecting portion 8 of the upper electrode sheet 2a in parallel with the electrode end portions 6d and 6c. The respective electrode end portions 7c and 7d are electrically connected to the lower circuit extended portions 7e and 7f with a conductive adhesive, not shown.

In association with the respective electrode ends 6c, 7c, 6d, and 7d of the connecting portion 8, through holes 9a to 9d are formed on the lower electrode panel 3 prepared as a laminated member of the protective panel main body 3b and the lower electrode sheet 3a.

Moreover, from these through holes 9a to 9d, the electrode ends 6c, 7c, 6d, and 7d are allowed to conduct to the corresponding connecting-side end portions 10a of an FPC 10 (flexible printed circuit board) through a conductive adhesive filled inside the through holes 9a to 9d. As the FPC 10, as shown in FIG. 1B, any structure may be used as long as electric signals are respectively obtained through the through holes 9a to 9d; however, preferably, the following structure is used. That is, the FPC 10 is preferably prepared as a FPC 10 with pins, where four conductive metal pins 11 to 14 to be respectively fitted to the through holes 9a to 9d are formed onto the connecting-side end portions 10a so as to stand thereon in correspondence with the through holes 9a to 9d.

Moreover, as a method for acquiring electric signals, in addition to the method for acquiring them from a back surface of the lower electrode panel 3, by inserting a commercially available FPC between the upper electrode sheet 2a and the lower electrode panel 3 from the side portion thereof, electric signals may be externally outputted, as has been normally carried out in the touch panel.

Moreover, the decorative sheet 2b having a transparent window portion 18 is bonded to the surface of the upper electrode sheet 2a. The decorative sheet 2b is placed on one surface of the transparent insulating sheet 2e, that is, a film made from an engineering plastic material, such as a polycarbonate-based, polyamide-based, or polyether-ketone-based engineering plastic material, or a plastic material, such as an acryl-based, or polyethylene terephthal-based, or polybutylene terephthal-based film material, in such a manner that the decorative layer 17 is formed in a frame shape (square frame shape) so as to cover a periphery of the transparent window portion 18, that is, the lower circuits 7a and 7b and the upper circuits 6a to 6d, and 7c, 7d, and the like. The portion covered with the decorative layer 17 forms a pattern portion, while the portion that is not covered with the decorative layer 17 forms the transparent window portion 18.

The decorative layer 17 is preferably formed by using a colored ink containing a resin, such as polyvinyl-based resin, polyamide-based resin, polyester-based resin, polyacryl-based resin, polyurethane-based resin, polyvinyl acetal-based resin, polyester urethane-based resin, or alkyd resin, as a binder, and a pigment or a dye having an appropriate color as a colorant. As the method for forming the decorative layer 17, for example, a normal printing method, such as a screen printing method, an offset printing method, a gravure printing method, or a flexographic printing method, may be used. In particular, in an attempt to carry out a multi-color printing process or a gradation expression, the offset printing method or the gravure printing method are suitably applied.

The entire-surface bonding process between the lower electrode sheet 3a and the protective panel main body 3b or the entire-surface bonding process between the upper electrode sheet 2a and the decorative sheet 2b may be carried out by using a pressure sensitive adhesive (PSA), not shown. As the method for applying the PSA, a normal printing method, such as a screen printing method, an offset printing method, a gravure printing method, or a flexographic printing method, may be used.

The above description has explained the basic structure of the protective panel 1 with a touch input function in accordance with the embodiment of the present invention, and the following description will discuss structural portions by which the embodiment of the present invention is characterized.

The embodiment of the present invention is characterized by the following structures.

Figure 1E:
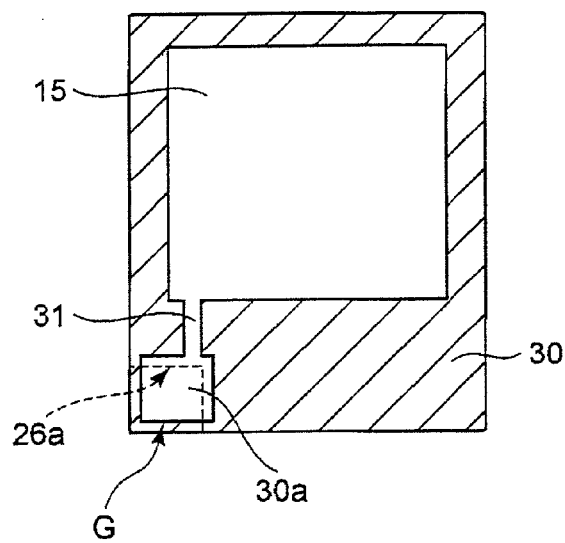
FIG. 1E is a plan view that shows a paste layer with which an upper electrode sheet and a lower electrode panel of the protective panel with a touch input function in accordance with the embodiment of the present invention are bonded to each other at peripheral edge portions.
Figure 4:
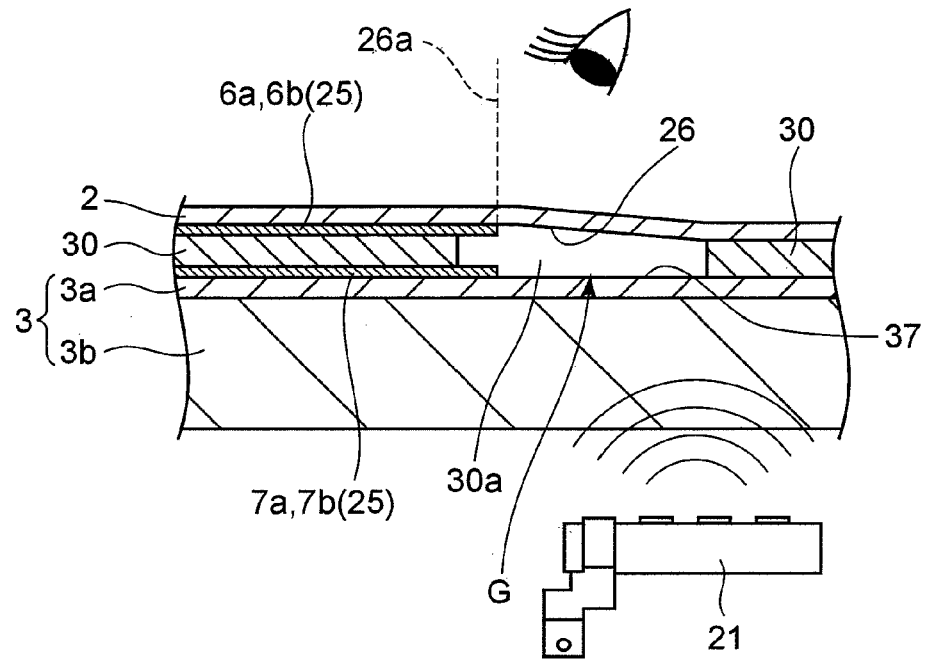
FIG. 4 is a cross-sectional view that explains prevention of sink mark in the protective panel with a touch input function in accordance with the embodiment of the present invention.

As shown in FIGS. 1E and 4, in the protective panel 1 with a touch input function on the electronic apparatus display window with a built-in antenna 21 installed on the back side (inner surface side), upon assembling the protective panel 1 into the front exterior casing 19, the upper electrode sheet 2a and the lower electrode panel 3 are provided with radio-wave transmitting sections 26 and 27 (in other word, conductor non-formation areas), with no conductors formed therein, within a frame area covered with the decorative layer 17 (in other words, an area other than an information input area to which information is inputted by a finger, a pen, or the like), and also within an area G (see FIG. 4) corresponding to the built-in antenna 21 (in other words, the planned area G (see FIG. 4) for the antenna formation capable of accepting the built-in antenna 21 on the back side upon the assembling). More specifically, as shown in FIG. 4, with respect to all the portion or most of the portion of a border 26a (line indicated by a dotted line) of the radio-wave transmitting section 26 relative to the conductor on the upper electrode sheet 2a side, the paste layer 30, used for bonding the upper electrode sheet 2a to the lower electrode panel 3 at peripheral edge portions thereof, is provided with a through hole 30a in a manner so as to overlap with, at least, an area near the inside of the border 26a. Moreover, provision is made so that air inside the through hole 30a is allowed to flow in and flow out of the through hole 30a, through an air bent 31 that has no conductor formed therein, and is allowed to communicate with the through hole 30a.

Figure 17:
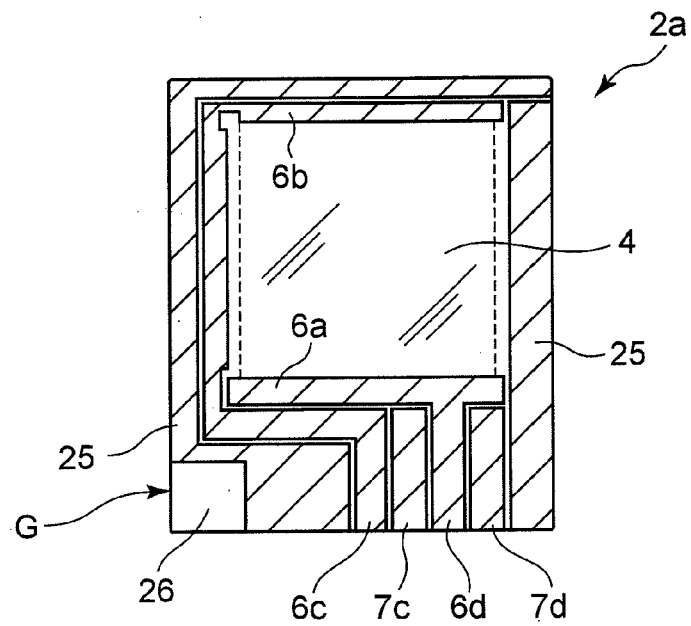
FIG. 17 is a plan view that explains an example of a radio wave transmitting section for use in transmitting a radio wave through a built-in antenna in an upper electrode sheet of the protective panel with a touch input function in accordance with the embodiment of the present invention.

FIG. 17 is a plan view that explains an example of the radio-wave transmitting section 26 for use in transmitting a radio wave relative to the built-in antenna 21 in the upper electrode sheet 2a. In FIG. 17, on one surface of the transparent insulating sheet, in addition to the upper circuits 6a to 6d and 7c and 7d formed on the upper transparent electrode 4 and on the periphery of the upper transparent electrode 4, a dummy circuit 25 used for adjusting the thickness is further formed, and the radio-wave transmitting section 26 having a substantially rectangular shape, with no conductor formed therein, is formed adjacent to the dummy circuit 25 so as to face an outer edge on the lower corner of the left side. As described earlier, the decorative sheet 2b is bonded onto the entire surface on the side opposite to the surface of the upper electrode sheet 2a on which the upper transparent electrode 4 is formed so that the movable sheet 2 is formed. Additionally, the thickness of the dummy circuit 25 is set to substantially the same thickness as that of the upper circuits 6a to 6d and 7c and 7d, and is also designed so as not to cause a short circuit with the upper circuits 6a to 6d and 7c and 7d.

Figure 18:
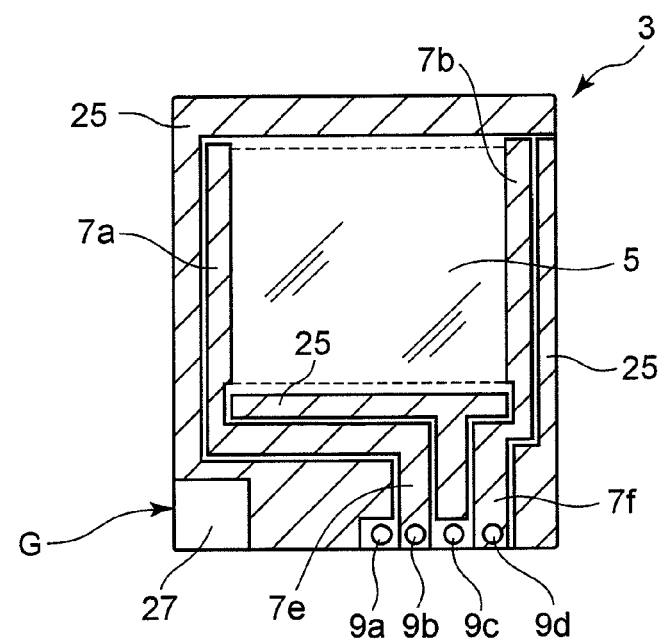
FIG. 18 is a plan view that explains an example of a radio wave transmitting section for use in transmitting a radio wave through a built-in antenna in a lower electrode sheet of the protective panel with a touch input function in accordance with the embodiment of the present invention.

Moreover, FIG. 18 is a plan view that explains an example of the radio-wave transmitting section 27 for use in transmitting a radio wave through the built-in antenna in the lower electrode sheet 3a. In FIG. 18, on one surface of the transparent insulating sheet, in addition to the lower circuits 7a, 7b, 7e, and 7f formed on the lower transparent electrode 5 and on a periphery of the lower transparent electrode 5, a dummy circuit 25 used for adjusting the thickness is further formed, and the radio-wave transmitting section 27 having a substantially rectangular shape, with no conductor formed therein, is formed adjacent to the dummy circuit 25 so as to face an outer edge on the lower corner of the left side. As described earlier, the protective panel main body 3b is bonded onto the entire surface on the side opposite to a surface of the lower electrode sheet 3a on which the lower transparent electrode 5 is formed so that the lower electrode panel 3 is formed. Additionally, the thickness of the dummy circuit 25 is set to substantially the same thickness as that of the lower circuits 7a, 7b, 7e, and 7f, and is also designed so as not to cause a short circuit with the lower circuits 7a, 7b, 7e, and 7f.

In the same manner as in the upper circuits 6a to 6d and 7c and 7d, or the lower circuits 7a, 7b, 7e, and 7f, the dummy circuit 25 can be formed by using metal, such as gold, silver, copper, or a conductive paste such as nickel, or carbon, through a printing method, such as a screen printing method, an offset printing method, a gravure printing method, or a flexographic printing method. In this case, in the radio-wave transmitting sections 26 and 27, not only the upper circuits 6a to 6d and 7c and 7d, the lower circuits 7a, 7b, 7e, 7f and the dummy circuit 25, but also transparent conductive films, coated upon forming the transparent electrodes 4 and 5, are not left so that conductors are not placed at all. Moreover, although the dummy circuit 25 is formed in FIGS. 17 and 18, the dummy circuit 25 is of course not formed in a case where no portions that require thickness adjustments are present except for the radio-wave transmitting sections 26 and 27.

In this manner, the upper electrode sheet 2a and the lower electrode panel 3 are designed so as to have the radio-wave transmitting sections 26 and 27 for use in transmitting a radio wave so that, as shown in FIG. 1F, since no conductors are present in the protective panel 1 at the area G where a radio wave is allowed to transmit the built-in antenna placed on the back side of the protective panel 1 with a touch input function, no radio-wave interference is caused.

Moreover, FIG. 1E is a plan view that shows one embodiment of the paste layer 30 with which the upper electrode sheet 2a and the lower electrode panel 3a of the movable sheet 2 are bonded to each other at peripheral edge portions thereof. Of the frame area covered with the decorative layer 17 in the upper electrode sheet 2a, the thicknesses of a portion where the circuits, such as the upper electrodes 6a to 6d and 7c and 7d or the dummy circuit 25, are formed and the radio-wave transmitting section 26 where no circuits are formed are different from each other by the corresponding circuit portion; however, with respect to most of the portions of the border 26a relative to the conductor in the radio-wave transmitting section 26 on the upper electrode sheet 2a side, since the paste layer 30, used for bonding the upper electrode sheet 2a and the lower electrode panel 3 at their peripheral edges, has the through hole 30a in a manner so as to be overlapped with the area near the inner side of the border 26a, when viewed from a surface of the movable sheet 2, no sink mark that tends to be caused by the presence or absence of the circuit formation (for example, a step of about 20 μm when the circuit thickness is about 10 μm) occurs, when viewed from the surface of the movable sheet 2. This is because, as shown in FIG. 4, in the area G (planned area for the antenna formation) in which the through hole 30a is located, since the movable sheet 2 is kept in a non-bonded state, the border 26a of the radio-wave transmitting section 26, located within the area G, is free from the occurrence of an abrupt deformation in the base member of the movable sheet 2. The area near the inner side of the border 26a to be overlapped with the through hole 30a is preferably kept away from the border 26a as far as possible, so as to make the base member of the movable sheet 2 deformed slowly.

The through hole 30a is formed only on the paste layer 30.

As the paste layer 30, a double-sided bonding tape punched out into a desired shape, or a transparent adhesive having an insulating property, made from an acrylic resin, an epoxy resin, a phenolic resin, a vinyl resin, or the like, may be used. As the forming method of the paste layer 30 in the case of using the transparent adhesive, for example, a normal printing method, such as a screen printing method, an offset printing method, a gravure printing method, or a flexographic printing method, may be used.

Additionally, in the present embodiment shown by the combination of the paste layer 30 of FIG. 1E and the upper electrode sheet 2a of FIG. 17, although portions near the two ends of the border 26a of the radio-wave transmitting section 26 on the upper electrode sheet 2a side (a left end edge portion and a lower end edge portion of the border 26a of FIG. 1E) are not located within the area in which the through hole 30a is present, most of the portion thereof (portions except for the left end edge portion and the lower end edge portion of the border 26a in FIG. 1E) is located within the area in which the through hole 30a is present; therefore, it is possible to obtain the aforementioned sink-mark-preventing effect sufficiently.

Figure 5:
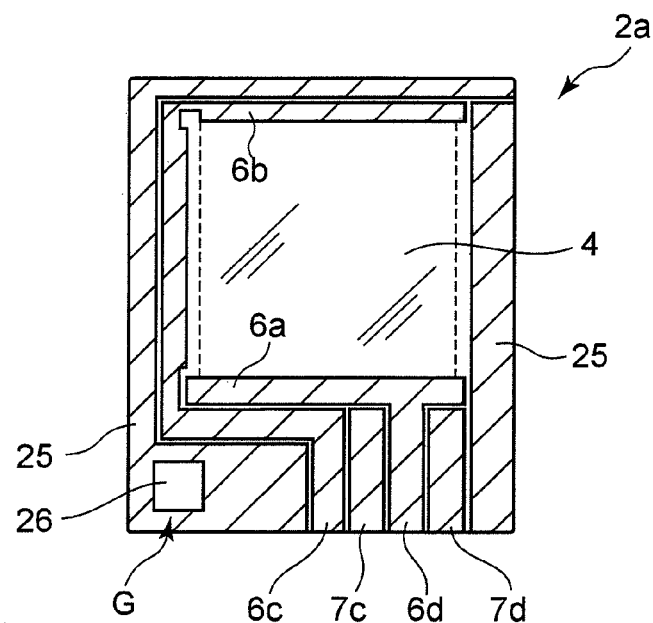
FIG. 5 is a plan view that explains another example of a radio wave transmitting section for use in transmitting a radio wave through a built-in antenna in an upper electrode sheet of the protective panel with a touch input function in accordance with the embodiment of the present invention.
Figure 6:
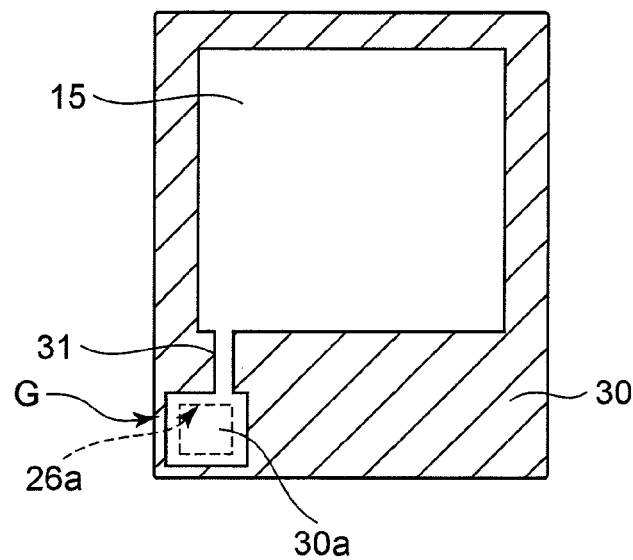
FIG. 6 is a plan view that shows another working example of a paste layer with which an upper electrode sheet and a lower electrode panel of the protective panel with a touch input function in accordance with the embodiment of the present invention are bonded to each other at peripheral edge portions.

However, in a case where the size of the built-in antenna 21 is small so that the radio-wave transmitting section 26 can be formed into a small size correspondingly (see FIG. 5), it is preferable to form such a structure that all the border 26a of the radio-wave transmitting section 26 on the upper electrode sheet 2a side is located within the area in which the through hole 30a is present (see FIG. 6).

Moreover, in the modified example of the embodiment shown in FIG. 6, the through hole 30a is overlapped not only with the area near the inside of the border 26a of the radio-wave transmitting section 26, but also with the area near the outside thereof. In comparison with the structure in which the through hole 30a is overlapped only with the area near the inside of the border 26a, this structure can maintain the sink-mark-preventing effect, even when a positional deviation occurs between the upper electrode sheet 2a and the paste layer 30.

As a specific example thereof, by taking account of production errors (for example, printing error) or the like among the lower electrode panel 3, the movable sheet 2, and the paste layer 30, the through hole 30a is preferably formed so that, as clearly shown by FIG. 4, the edge portion of the through hole 30a of the paste layer 30 is located outside the transmitting section border 26a by about 0.5 mm, relative to the radio-wave transmitting section 26. With this structure, even when a printing deviation occurs, the paste layer 30 is prevented from protruding into the radio-wave transmitting sections 26 and 27 (in other words, into conductor non-formation areas).

Figure 9A:
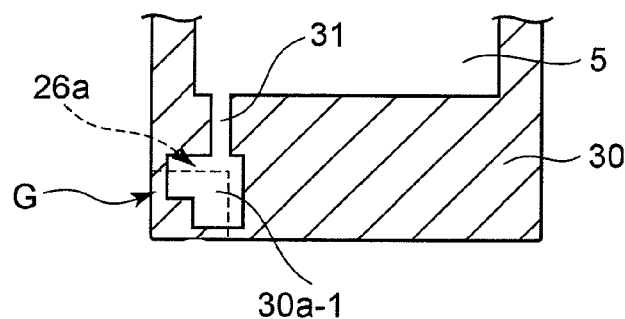
FIG. 9A is a view that shows a through-hole shape of the paste layer in the protective panel with a touch input function in accordance with a modified example of the embodiment of the present invention.
Figure 9B:
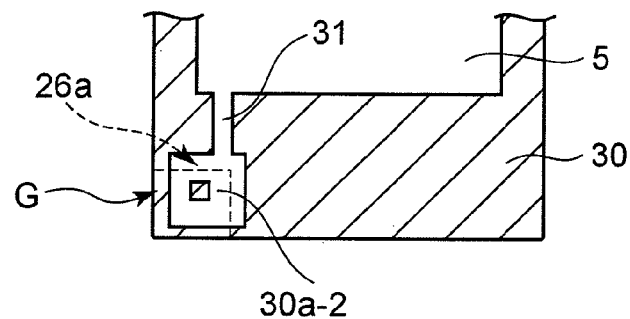
FIG. 9B is a view that shows a through-hole shape of the paste layer in the protective panel with a touch input function in accordance with another modified example of the embodiment of the present invention.

Moreover, the through hole 30a may be formed into any shape as long as, at least, it is allowed to be overlapped with the area near the inside of the border 26a, and the shape is not limited by the rectangular shape. For example, relative to the substantially rectangular-shaped radio-wave transmitting section 26, an L-letter shaped through hole 30a-1 may be formed (see FIG. 9A), or a square frame-shaped through hole 30a-2 may be formed (see FIG. 9B).

Figure 19A:
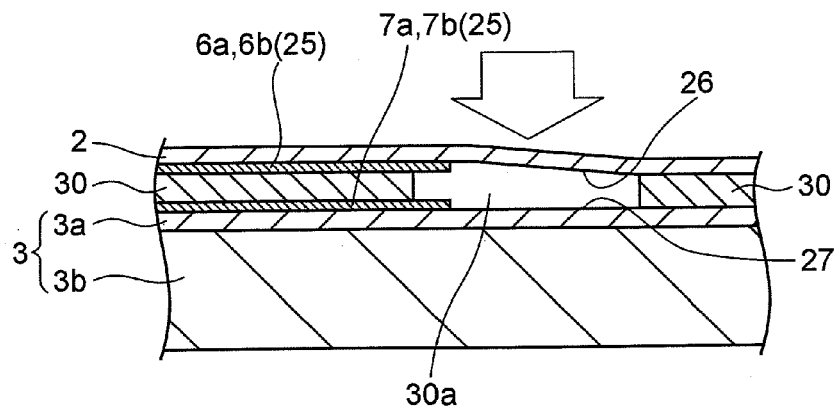
FIG. 19A is a cross-sectional view that explains the necessity of an air bent in the protective panel with a touch input function in accordance with the embodiment of the present invention.
Figure 19B:
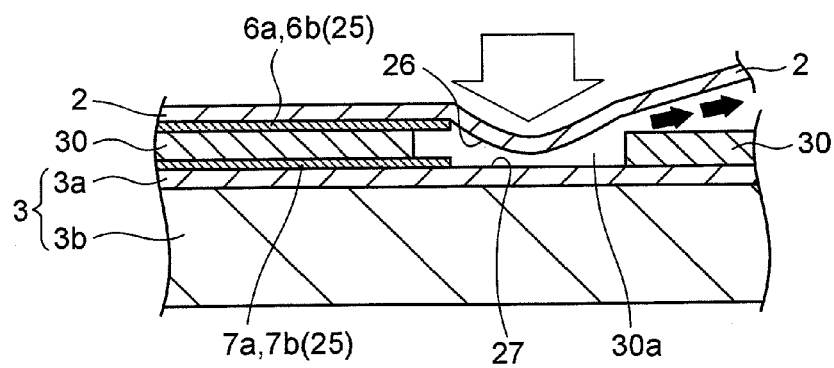
FIG. 19B is a cross-sectional view that also explains the necessity of an air bent in the protective panel with a touch input function in accordance with the embodiment of the present invention.
Figure 19C:
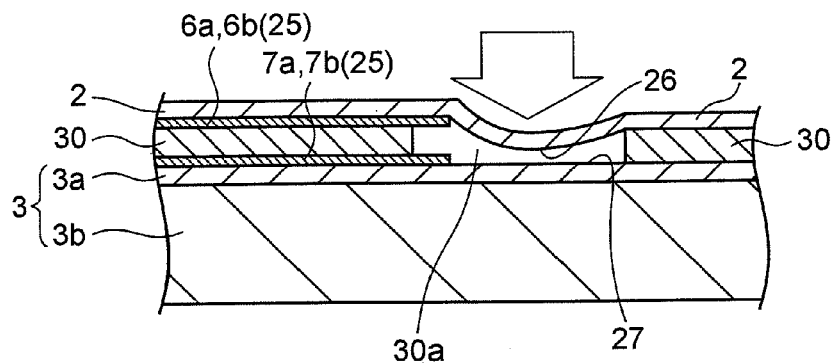
FIG. 19C is a cross-sectional view that also explains the necessity of an air bent in the protective panel with a touch input function in accordance with the embodiment of the present invention.

Furthermore, in the embodiments shown in FIG. 1E and FIG. 6, the air bent 31 is formed by a non-formation portion (portion without the paste layer 30 formed therein) of the paste layer 30, and one end is allowed to communicate with the through hole 30a, with the other end being allowed to communicate with the air cell 15 between the electrodes 4 and 5. The air bent 31 serves as a passage through which a gas is allowed to flow in and flow out of the through hole 30a. In a case where no air bent is formed, with the through hole 30a being kept as a tightly-closed space, upon application of a strong load during the bonding processes, the inside air, which has nowhere to go due to the compressed through hole 30a, momentarily pushes the bonded surfaces of the paste layer 30 to open, and is released outside of the protective panel with a touch panel function from the inside of the through hole 30a (see FIGS. 19A and 19B). Thereafter, when the bonded surfaces of the paste layer 30, which have been pushed to open, with the movable sheet 2 being kept in a concave shape, are closed, the concave state of the movable sheet 2 is maintained, as it is, even after the release of the load (see FIG. 19C). In contrast, in the embodiment of the present invention, since the air inside the through hole 30a is allowed to flow in and out through the air bent 31, even in a case where, at the time of bonding processes between the movable sheet 2 and the lower electrode panel 3, the through hole 30a is compressed, the movable sheet 2, once brought into the concave state, can be returned to its original state (where no concave portion is present in the movable sheet 2).

Figure 2:
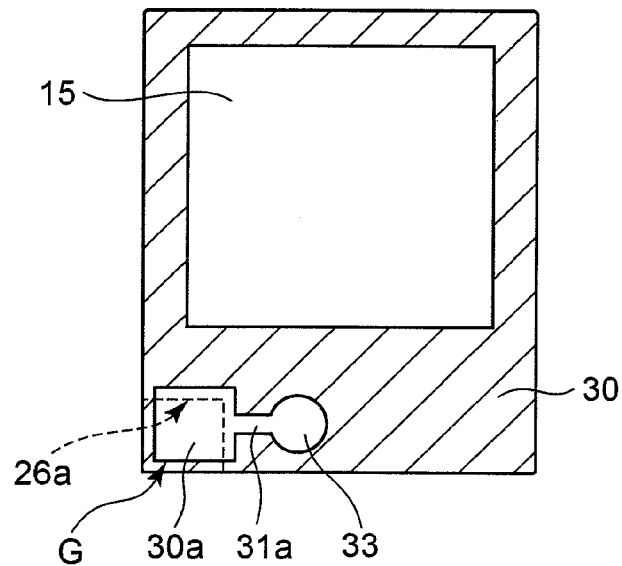
FIG. 2 is a plan view that shows a paste layer with which an upper electrode sheet and a lower electrode panel of the protective panel with a touch input function in accordance with the modified example of the embodiment of the present invention are bonded to each other at peripheral edge portions.
Figure 7:
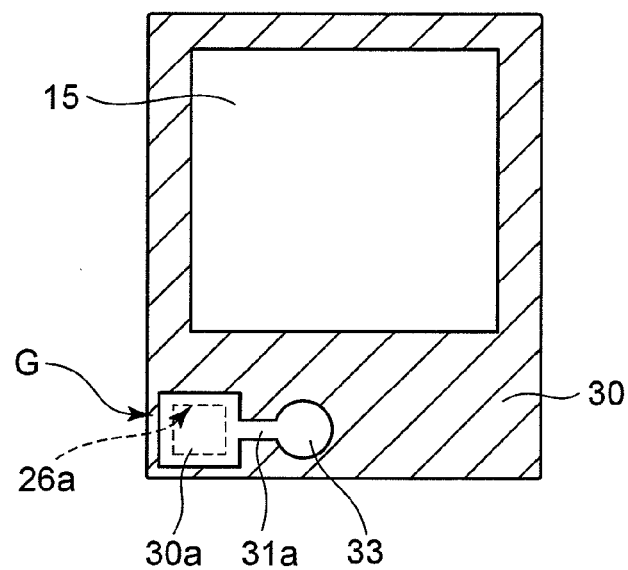
FIG. 7 is a plan view that shows still another working example of a paste layer with which an upper electrode sheet and a lower electrode panel of the protective panel with a touch input function in accordance with the embodiment of the present invention are bonded to each other at peripheral edge portions.

Moreover, in place of the air bent 31, as shown in FIGS. 2 and 7, one end of the air bent 31a formed by the non-formation portion of the paste layer 30, with the other end being allowed to communicate with the through hole 30a, may be allowed to communicate with a hole processed portion (another through hole of the paste layer 30) of the protective panel 1. For example, as the hole processed portion 33, in addition to a hole in which a batch of logo marks is placed, holes, such as a speaker hole, an earphone hole, or a hole used for installing a camera lens, may be proposed.

Figure 3:
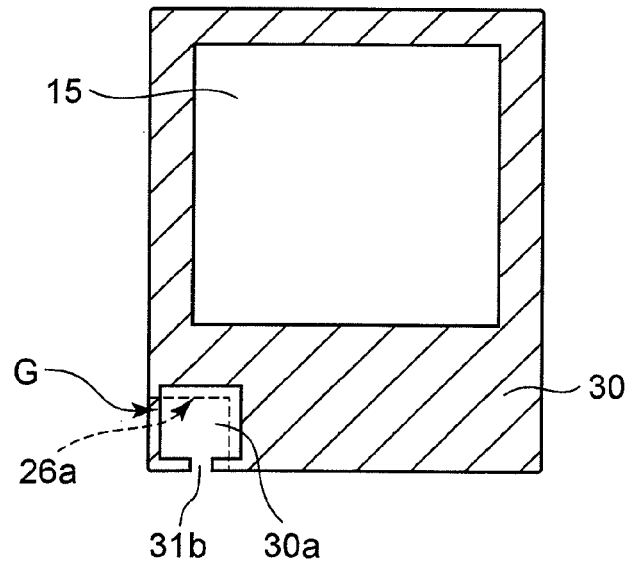
FIG. 3 is a plan view that shows a paste layer with which an upper electrode sheet and a lower electrode panel of the protective panel with a touch input function in accordance with another modified example of the embodiment of the present invention are bonded to each other at peripheral edge portions.
Figure 8:
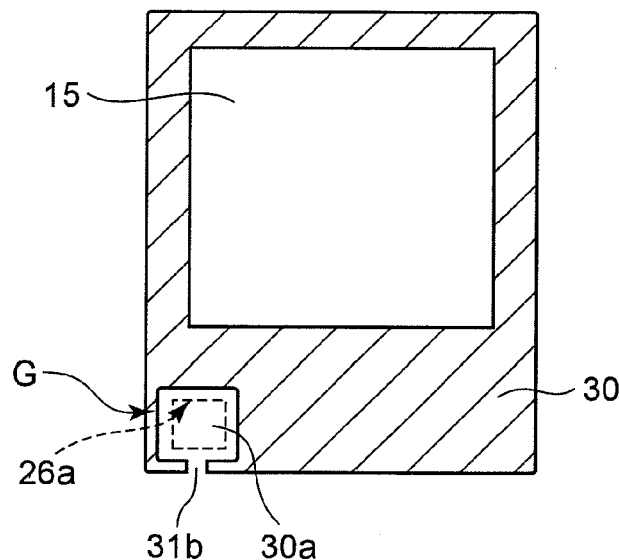
FIG. 8 is a plan view that shows the other working example of a paste layer with which an upper electrode sheet and a lower electrode panel of the protective panel with a touch input function in accordance with the embodiment of the present invention are bonded to each other at peripheral edge portions.

Furthermore, in place of the air bent 31, as shown in FIGS. 3 and 8, one end of the air bent 31*b* formed by the non-formation portion of the paste layer 30, with the other end being allowed to communicate with the through hole 30*a*, may be allowed to communicate with the outside of an end surface of the protective panel 1.

Figure 10A:
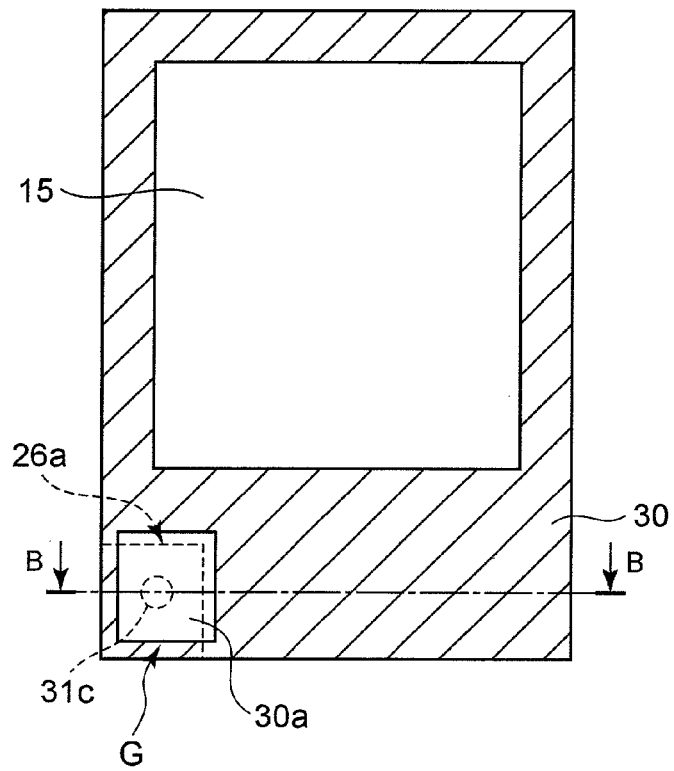
FIG. 10A is a plan view that shows still another working example of a paste layer with which an upper electrode sheet and a lower electrode panel of the protective panel with a touch input function in accordance with the embodiment of the present invention are bonded to each other at peripheral edge portions.
Figure 10B:
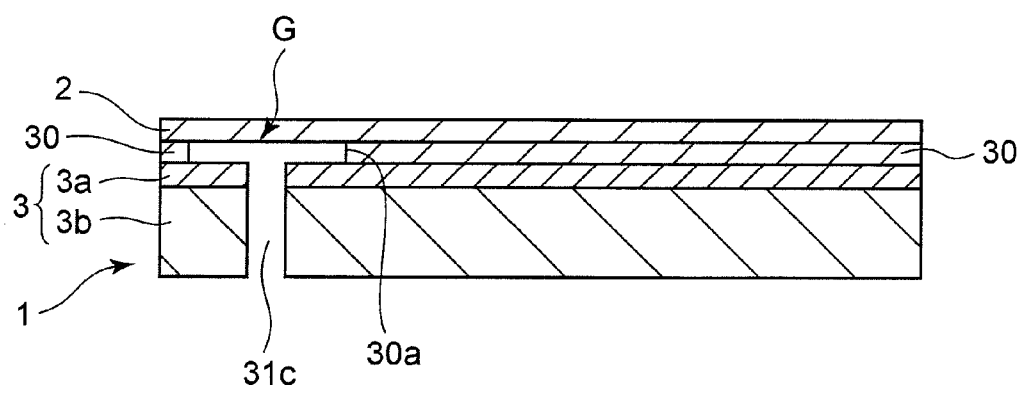
FIG. 10B is a cross-sectional view of FIG. 10A, taken along a B-B line.
Figure 11:
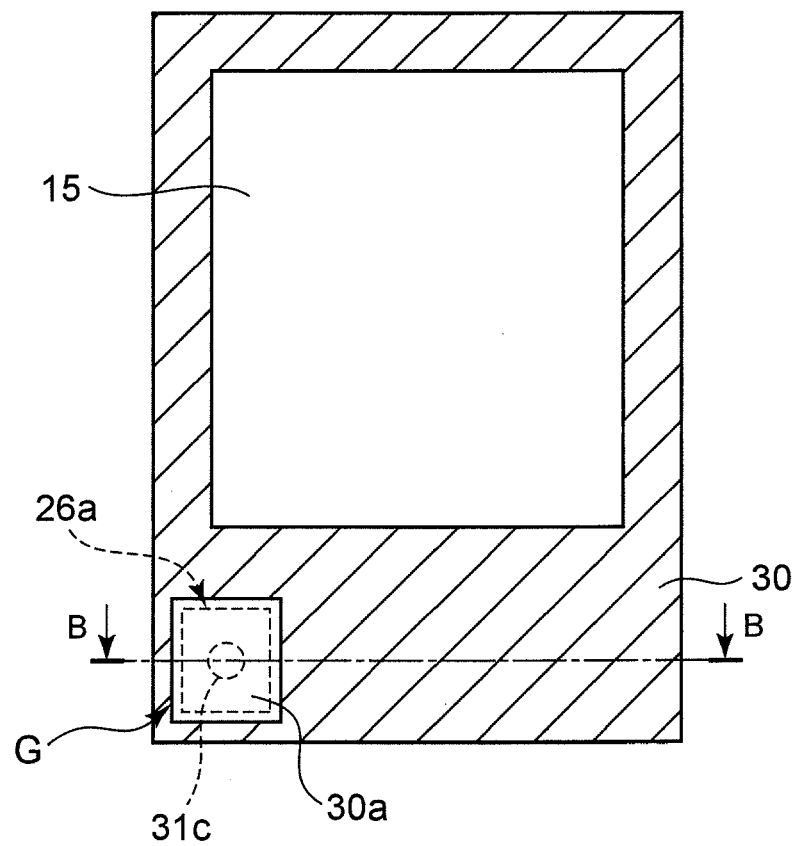
FIG. 11 is a plan view that shows still another working example of a paste layer with which an upper electrode sheet and a lower electrode panel of the protective panel with a touch input function in accordance with the embodiment of the present invention are bonded to each other at peripheral edge portions.
Figure 12:
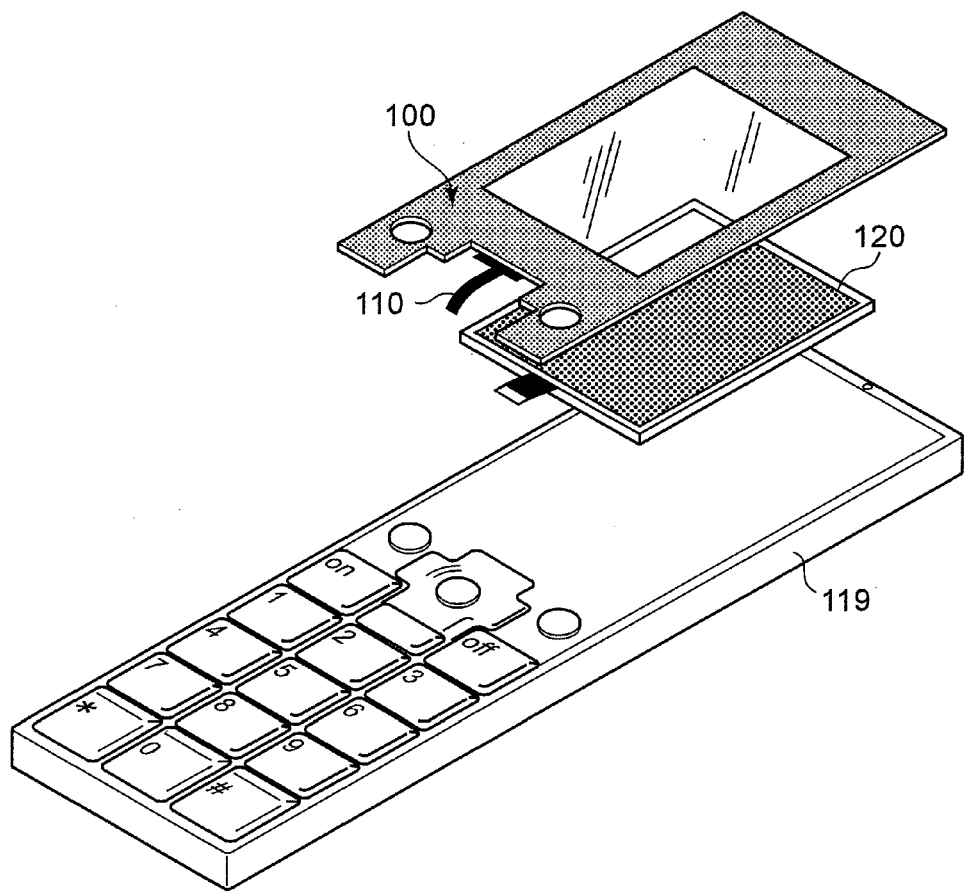
FIG. 12 is an exploded perspective view that explains an electronic apparatus equipped with a conventional protective panel with a touch input function.
Figure 13:
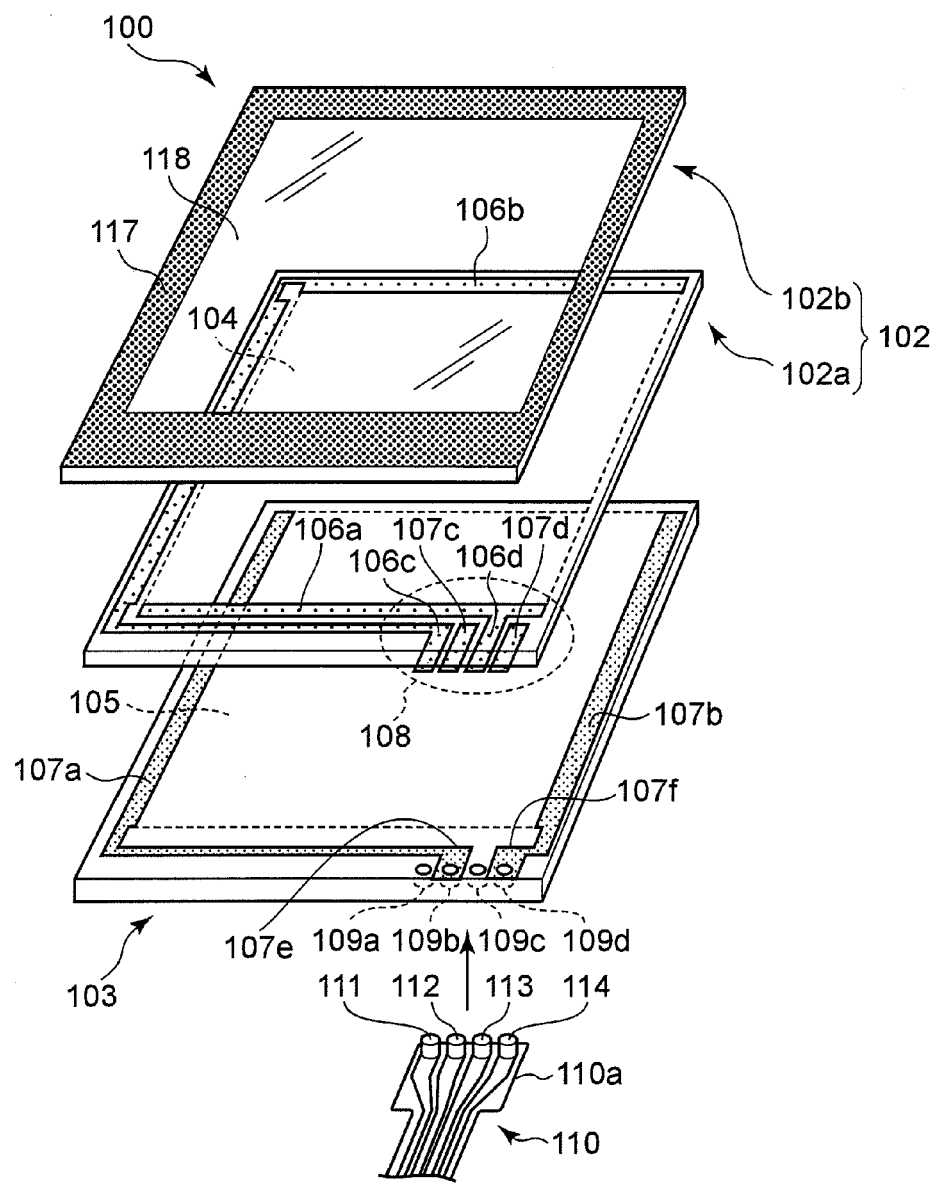
FIG. 13 is an exploded perspective view that explains the conventional protective panel with a touch input function.
Figure 14A:
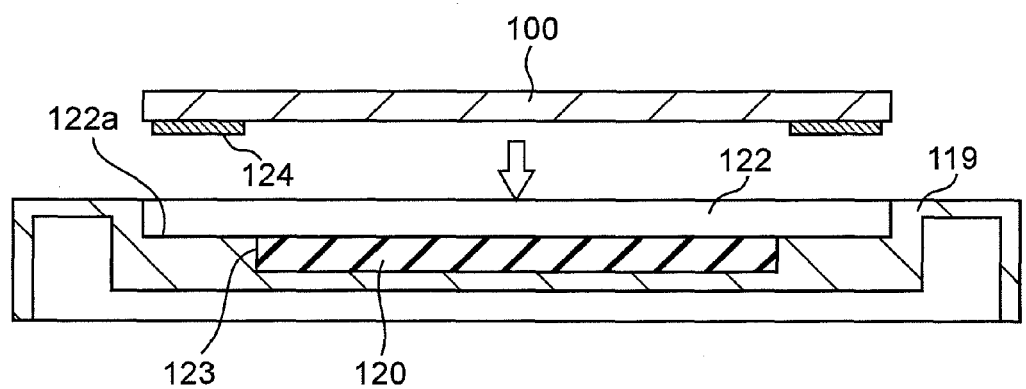
FIG. 14A is a cross-sectional view showing one example of a state prior to assembling the mounted structure in a front-face packaging casing in which the conventional protective panel with a touch input function is used.
Figure 14B:
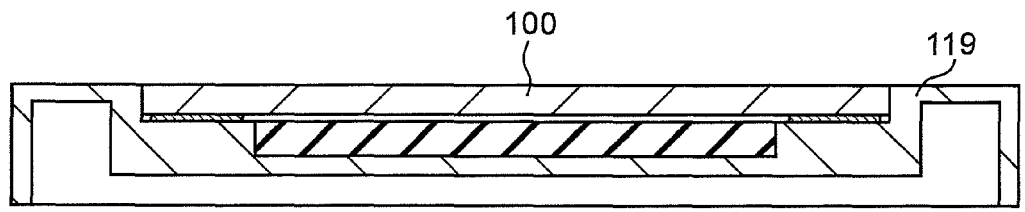
FIG. 14B is a cross-sectional view showing one example of a state after assembling the mounted structure in a front-face packaging casing in which the conventional protective panel with a touch input function is used.
Figure 15:
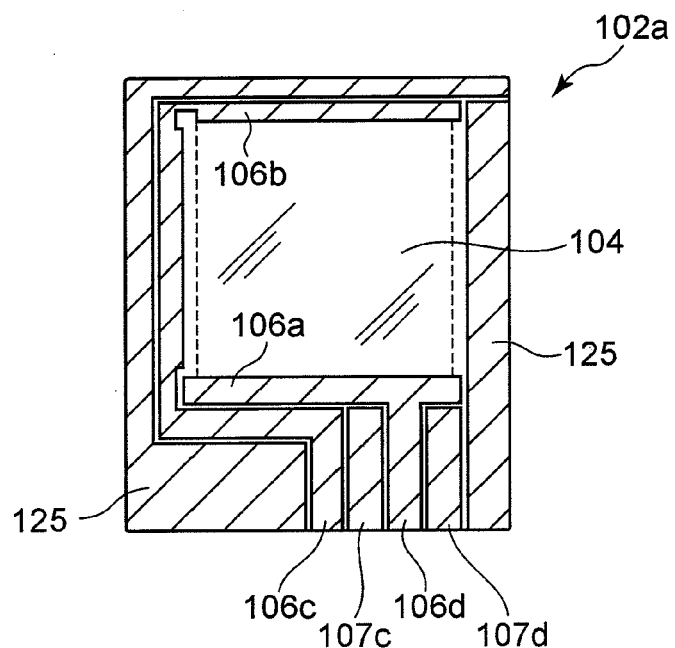
FIG. 15 is a plan view that explains a dummy circuit in a conventional upper electrode sheet.
Figure 16:
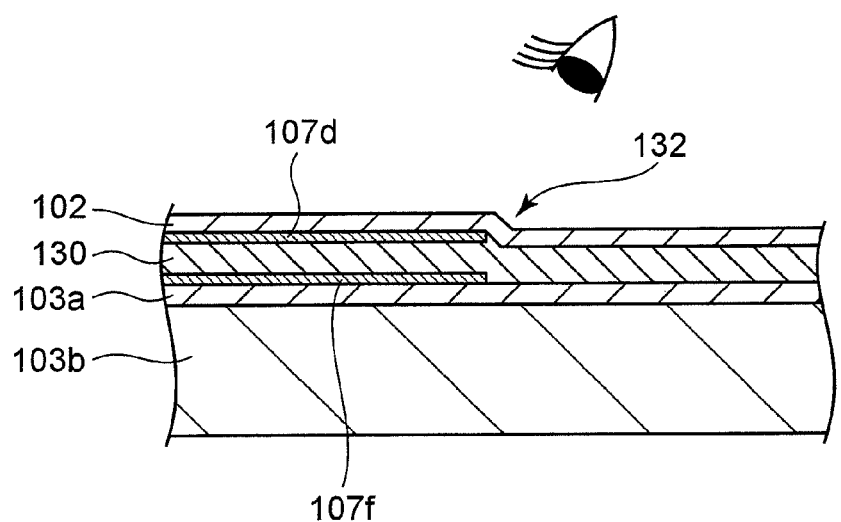
FIG. 16 is a cross-sectional view that explains an issue of sink mark in the prior art technique.

As shown in FIGS. 10A and 10B and FIG. 11, in place of the air bent 31, the air bent 31*c* formed by the non-formation portion of the paste layer 30, with one end being allowed to communicate with the through hole 30*a*, may be formed as a through hole placed in the lower electrode panel 3 so as to be allowed to communicate with the outside of a lower surface of the protective panel 1. FIG. 10B is a cross-sectional view of FIG. 10A, taken along a B-B line, and in FIG. 11 also, by cutting through the B-B line, a cross-sectional view that is the same as FIG. 10B is formed, although positions are slightly deviated therefrom, so that, in FIG. 11, an air bent 31*c* that is the same as FIG. 10A is formed.

Moreover, the decorative layer 17 of the decorative sheet 2*b* may be provided with a metal gloss pattern, except for those portions corresponding to the radio-wave transmitting sections 26 and 27 for use in transmitting a radio wave. The metal thin-film layer used for the metal gloss pattern may be formed by using metal, such as aluminum, nickel, gold, platinum, chromite, copper, tin, indium, silver, titanium, lead, or zinc, or an alloy, or a compound of these, through a method, such as a vapor deposition method, a sputtering method, an ion plating method, or a plating method. The film thickness of the metal thin film layer is generally set to about 0.05 µm. Additionally, a hard-coat film may be pasted onto an upper surface of the decorative sheet 2*b*.

In accordance with the present embodiment, since the upper electrode sheet 2*a* and the lower electrode panel 3 are provided with the radio-wave transmitting sections 26 and 27 (conductor non-formation areas), no radio-wave interference is caused in the built-in antenna 21 to be placed on the back side thereof. Moreover, with respect to all the portion or most of the portion of the border 26*a* relative to the conductor in the radio-wave transmitting sections 26 and 27 (conductor non-formation areas) on the upper electrode sheet 2*a* side, the paste layer 30, used for bonding the upper electrode sheet 2*a* to the lower electrode panel 3 at peripheral edge portions thereof, is provided with the through hole 30*a* in a manner so as to overlap with, at least, an area near the inside of the border 26*a* so that no sink mark occurs. That is, it is possible to achieve both of the advantages that no radio-wave interference is caused and that a superior outside appearance without sink mark is obtained.

By properly combining the arbitrary embodiments of the aforementioned various embodiments, the effects possessed by the embodiments can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

INDUSTRIAL APPLICABILITY

A protective panel with a touch input function that is superior in surface flatness, and an electronic apparatus having the protective panel in accordance with the present invention make it possible to achieve both of advantages that no radio-wave interference is caused and that a superior outside appearance without sink mark is obtained, and are effectively utilized as: a portable information terminal such as a PDA or a handy terminal; an OA apparatus such as a copying machine or a facsimile; a smart telephone; a portable telephone; a portable game machine; an electronic dictionary; a car navigation system; a small-size PC; or various home electric appliances.

The invention claimed is:

1. A protective panel with a touch input function of an electronic apparatus display window, which is superior in surface flatness, comprising:
   a lower electrode panel provided with a lower transparent electrode and lower circuits formed on a periphery of the lower transparent electrode, which are placed on an upper surface of a protective panel main body made of a resin plate;
   an upper electrode sheet provided with an upper transparent electrode placed at a position opposed to the lower transparent electrode and upper circuits formed on a periphery of the upper transparent electrode, which are placed on a lower surface of a transparent insulating sheet, with peripheral edge portions thereof being bonded to the lower electrode panel so as to form an air cell between the lower transparent electrode and the upper transparent electrode; and
   a decorative sheet that is provided with a decorative layer formed into a frame shape so as to cover the lower circuits and the upper circuits, and placed on at least one of surfaces of a transparent insulating sheet, the decorative sheet being bonded to an upper surface of the upper electrode sheet,
   wherein upon assembling, a built-in antenna is placed on a back side thereof,
   wherein the upper electrode sheet and the lower electrode panel are respectively provided with conductor non-formation areas for use in transmitting radio waves, where no conductors are formed, within a frame area to be covered with the decorative layer, in a planned area G for an antenna formation capable of accepting the built-in antenna, and
with respect to all portion or most of the portion of a border of the conductor non-formation area on the upper electrode sheet side, a paste layer, used for bonding the upper electrode sheet to the lower electrode panel at the peripheral edge portions thereof, is provided with a through hole in a manner so as to overlap with, at least, an area near an inside of the border, so that air inside the through hole is allowed to flow in and out of the inside of the through hole through air bents that are allowed to communicate with the through hole.

2. The protective panel with a touch input function that is superior in surface flatness according to claim 1, wherein the through hole is also overlapped with an area near an outside of the border.

3. The protective panel with a touch input function that is superior in surface flatness according to claim 1, wherein the air bent is formed by a non-formation portion of the paste layer, and allowed to communicate with the air cell between the electrodes.

4. The protective panel with a touch input function that is superior in surface flatness according to claim 1, wherein the air bent is formed by a non-formation portion of the paste layer, and allowed to communicate with a hole-processed portion of the protective panel.

5. The protective panel with a touch input function that is superior in surface flatness according to claim 1, wherein the air bent is formed by a non-formation portion of the paste layer, and allowed to communicate with an outside of an end face of the protective panel.

6. The protective panel with a touch input function that is superior in surface flatness according to claim 1, wherein the air bent is made of a through hole formed on the lower electrode panel, and allowed to communicate with an outside of a lower surface of the protective panel.

7. The protective panel with a touch input function that is superior in surface flatness according to claim 1, wherein the upper electrode sheet and the lower electrode panel have a dummy circuit on a frame area covered with the decorative layer.

8. An electronic apparatus comprising:
   a front exterior casing provided with a panel fit-in portion;
   a display device disposed on a bottom surface of the panel fit-in portion of the front exterior casing; and
   the protective panel according to claim 1 that is fitted into the panel fit-in portion of the front exterior casing so as to cover the display device.

9. An electronic apparatus comprising:
   a front exterior casing provided with a panel fit-in portion having an opening on a bottom surface thereof;
   a display device disposed on a back side of the panel fit-in portion so as to allow a display screen to be exposed to the opening of the bottom surface of the panel fit-in portion of the front exterior casing; and
   the protective panel according to claim 1 that is fitted to the panel fit-in portion of the front exterior casing so as to cover the display device.

\* \* \* \* \*